(12) United States Patent
Kernwein et al.

(10) Patent No.: US 11,140,532 B2
(45) Date of Patent: Oct. 5, 2021

(54) COMMUNICATION SYSTEM

(71) Applicant: Westinghouse Air Brake Technologies Corporation, Wilmerding, PA (US)

(72) Inventors: Jeffrey Donald Kernwein, Cedar Rapids, IA (US); Bryan Clay Burke, Canton, NC (US); Stephen Howard Craven, Cedar Rapids, IA (US); James Hardy Moore, Fort Worth, TX (US); William Christopher Hall, Louisville, KY (US); Danial Rice, Frederick, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 0 days.

(21) Appl. No.: 16/719,095

(22) Filed: Dec. 18, 2019

(65) Prior Publication Data

US 2021/0195390 A1  Jun. 24, 2021

(51) Int. Cl.
*H04W 4/46* (2018.01)
*H04W 8/00* (2009.01)
*H04W 76/14* (2018.01)

(52) U.S. Cl.
CPC ............ *H04W 4/46* (2018.02); *H04W 8/005* (2013.01); *H04W 76/14* (2018.02)

(58) Field of Classification Search
CPC ........ H04W 4/46; H04W 76/14; H04W 8/005
See application file for complete search history.

(56) References Cited

U.S. PATENT DOCUMENTS

| | | | |
|---|---|---|---|
| 6,996,461 B2 | 2/2006 | Kane |
| 7,236,860 B2 | 6/2007 | Kane |
| 7,467,032 B2 | 12/2008 | Kane |
| 7,742,850 B2 | 6/2010 | Kane |
| 8,714,494 B2 | 5/2014 | Weber |
| 9,002,545 B2 | 4/2015 | Wilson |
| 9,168,936 B2 | 10/2015 | Grimm |
| 9,233,698 B2 | 1/2016 | Weber |
| 9,283,945 B1 | 3/2016 | Kernwein |
| 9,460,566 B2 | 10/2016 | Allwardt |
| 9,469,310 B2 | 10/2016 | Kernwein |
| 9,846,025 B2 | 12/2017 | Kirchner |
| 9,950,718 B2 | 4/2018 | Naylor |
| 10,077,033 B2 | 9/2018 | Oswald |
| 10,081,378 B2 | 9/2018 | Ruhland |

(Continued)

OTHER PUBLICATIONS

Examination report dated Aug. 3, 2021 for corresponding Australian Patent Application No. 2020289779 (3 pages).

*Primary Examiner* — Md K Talukder
(74) *Attorney, Agent, or Firm* — Mary D. Lawlor; The Small Patent Law Group LLC (57) ABSTRACT

A method and a communication system includes establishing a communication link between a first vehicle and an off-board database. The first vehicle and the off-board database are communicatively linked via a first communication system. A message from a second vehicle may be received via the off-board database. The second vehicle and the off-board database are communicatively coupled via a second communication system. A response may be communicated from the first vehicle to the second vehicle via the off-board database.

20 Claims, 2 Drawing Sheets

(56) References Cited

U.S. PATENT DOCUMENTS

| | | | |
|---|---|---|---|
| 2008/0122652 A1* | 5/2008 | Tengler | B60Q 9/008 |
| | | | 340/902 |
| 2008/0136670 A1* | 6/2008 | Tengler | G08G 1/20 |
| | | | 340/905 |
| 2009/0105920 A1 | 5/2009 | Penske | |
| 2009/0168759 A1* | 7/2009 | Katis | H04L 65/1083 |
| | | | 370/352 |
| 2014/0220966 A1* | 8/2014 | Muetzel | H04W 4/024 |
| | | | 455/426.1 |
| 2015/0134754 A1* | 5/2015 | Lauer | H04B 7/18506 |
| | | | 709/206 |
| 2016/0075356 A1 | 3/2016 | Kull | |
| 2016/0195404 A1* | 7/2016 | Prasad | G06T 11/206 |
| | | | 345/440 |
| 2016/0232721 A1* | 8/2016 | Singh | G07C 5/008 |
| 2016/0261696 A1* | 9/2016 | Kumar | H04W 4/20 |
| 2017/0043797 A1 | 2/2017 | Allshouse | |
| 2017/0149587 A1* | 5/2017 | Chaturvedi | H04L 67/141 |
| 2019/0130765 A1* | 5/2019 | Tulpule | H04W 4/46 |
| 2019/0212725 A1* | 7/2019 | Woodrow | G05D 1/0011 |
| 2019/0306680 A1* | 10/2019 | Doggart | H04W 4/08 |
| 2020/0042013 A1* | 2/2020 | Kelkar | G05D 1/0287 |
| 2020/0045150 A1* | 2/2020 | Lauer | H04L 69/40 |
| 2020/0168093 A1* | 5/2020 | Edwards | G08G 1/166 |
| 2020/0287960 A1* | 9/2020 | Higuchi | H04W 4/44 |
| 2020/0314609 A1* | 10/2020 | Harada | H04W 4/40 |

* cited by examiner

COMMUNICATION SYSTEM

BACKGROUND

Technical Field

The subject matter described relates to communication systems and methods.

Discussion of Art

Some systems include two or more devices, components, vehicles, or the like, that may need to communicate with each other. As one example, two vehicles may be logically coupled and may travel along a route together. As the two vehicles travel together, the two vehicles may need to communicate messages with each other. However, the vehicles may be unable to communicate directly with each other. For example, one vehicle may have the software, protocol, and/or circuitry to communicate using a first communication system, but the other vehicle may have the software, protocol, and/or circuitry to communicate using a different communication system. Alternatively, a signal between the vehicles may be too weak to send and/or receive a message. This can pose a risk if the two vehicles are unable to communicate with each other.

BRIEF DESCRIPTION

In one or more embodiments, a method includes establishing a communication link between a first vehicle and an off-board database. The first vehicle and the off-board database are communicatively linked via a first communication system. A message from a second vehicle may be received via the off-board database. The second vehicle and the off-board database are communicatively coupled via a second communication system. A response may be communicated from the first vehicle to the second vehicle via the off-board database.

In one or more embodiments, a system includes one or more processors onboard a first vehicle that may establish a communication link between the first vehicle and an off-board database. The first vehicle and the off-board database are configured to be communicatively coupled via a first communication system. The one or more processors may receive a message from a second vehicle via the off-board database. The second vehicle and the off-board database may be communicatively coupled via a second communication system. The one or more processors may communicate a response from the first vehicle to the second vehicle via the off-board database.

In one or more embodiments, a method includes establishing a communication link between a first vehicle and an off-board database. The first vehicle and the off-board database are communicatively linked via a first communication system. A message from a second vehicle may be received via the off-board database. The second vehicle and the off-board database are communicatively coupled via a second communication system. An operating setting of the first vehicle may be changed responsive to receiving the message from the second vehicle. A response may be communicated from the first vehicle to the second vehicle via the off-board database.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods that enable communication between different vehicles of a vehicle system via an off-board database when the different vehicles and the off-board database are setup to communicate using different communication systems.

As one example, the vehicle system may be a rail vehicle system that may move along a route. Two or more rail vehicles may travel together (by being mechanically coupled or by being mechanically separate but communicating with each other to travel together, such as in a convoy) along a route. One of the rail vehicles may be identified as an End-of-Train (EOT) vehicle, and another of the rail vehicles may be identified as a Head-of-Train (HOT) vehicle, such that the HOT vehicle is in front of the EOT vehicle in a direction of movement of the vehicle system. The EOT may include a vehicle controller that is capable of communicating via a first communication system and a second communication system. Alternatively, the HOT may include a vehicle controller that is capable of communicating only via the first communication system. The EOT and HOT may communicate with each other via the off-board database, and in particular, via communication links established between the EOT vehicle and the off-board database, and the HOT vehicle and the off-board database. For example, the off-board database may act as a communication bridge, pathway, or link between the different vehicles of the vehicle system.

The vehicles can communicate signals, including at least identifications of the vehicles, positions of the vehicles, command signals, status requests, status reports, or the like, with the other vehicles of the vehicle system via the off-board database, such as a back-office server of the positive train control system.

In one or more embodiments, the back-office server may use the signals to automatically control one or more operational settings of one or more of the vehicles (e.g., a brake setting and/or a throttle setting), to communicate the information to another vehicle that moves along the same route, to alert an operator onboard the vehicle system, to direct the operator onboard the vehicle system to manually change one or more operational settings of one or more of the vehicles, or the like. Optionally, this server can use the signal to schedule repair, inspection, or maintenance of the route device.

While some embodiments described herein relate to rail vehicle systems, positive train control systems, and wayside devices, not all embodiments of the inventive subject matter are restricted to rail vehicles, positive train control systems, or wayside devices. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. One or more embodiments may relate to control systems that control operation of vehicles other than positive train control systems. Additionally, the vehicle systems may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel.

In one or more embodiments, the systems and methods described herein may establish communication links with the off-board database, or back-office server, whenever vehicles are added to or leave the vehicle system. For example, a first vehicle may be the HOT vehicle of a vehicle system. Another vehicle may be added to the vehicle system (e.g., mechanically and/or logically coupled with) such that the other vehicle becomes the new HOT vehicle of the vehicle system. The new HOT vehicle may establish a new communication link with the back-office server to allow the new HOT vehicle to communicate with the EOT vehicle via the back-office server. Similarly, a new EOT vehicle may be added to the vehicle system, and the new EOT may establish a new communication link with the back-office server and identify the HOT vehicle, and any other vehicle, that the new EOT vehicle wants to communicate with.

The designation HOT vehicle may or may not represent a lead vehicle of a vehicle system, or a first vehicle based on a direction of travel of the vehicle system. Similarly, the EOT vehicle may or may not represent the last or final vehicle of the vehicle system based on the direction of travel of the vehicle system. In one or more embodiments, the EOT vehicle may be identified based on which vehicle of a vehicle system has an EOT device onboard the vehicle. For example, the EOT device may be a transferrable device that may be moved from one vehicle to another vehicle that may change the designation of the respective vehicle from which the EOT device is removed, and the other vehicle where the EOT is moved to may be identified as a new EOT vehicle. Similarly, the HOT vehicle may be identified based on which vehicle of a vehicle system has a HOT device onboard the vehicle.

Figure 1:
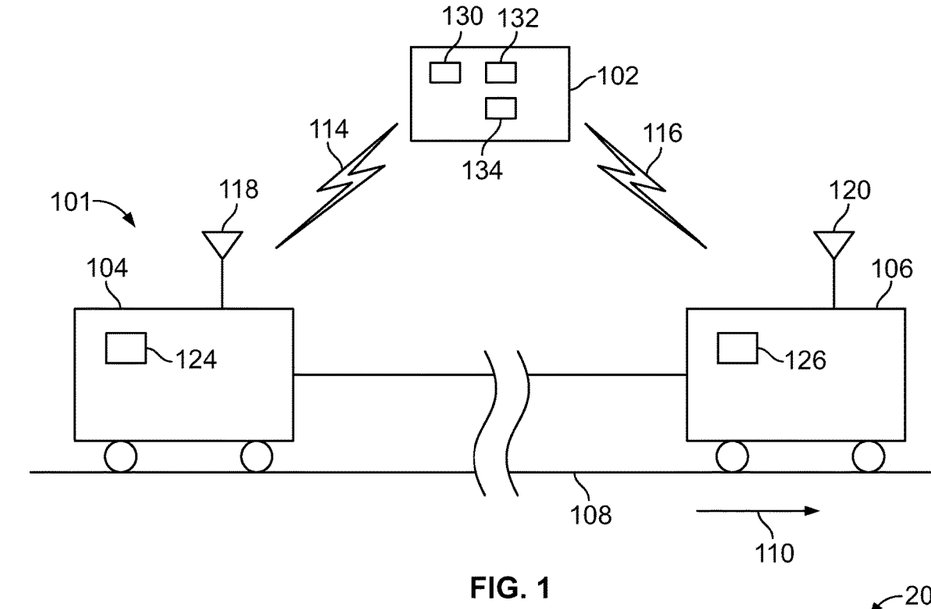
FIG. 1 schematically illustrates one example of a system.

FIG. 1 illustrates one example of a system 100 that includes a vehicle system 101. The vehicle system can be a rail vehicle system, but optionally can be automobiles, trucks, buses, mining vehicles, marine vessels, aircraft, agricultural vehicles, or other off-highway vehicles. The illustrated embodiment includes at least two rail vehicles that are mechanically coupled with each other and move together in a direction 110 along a route 108 as a common vehicle system. Optionally, the vehicle system can be formed from two or more vehicles that may travel together (e.g., by being mechanically coupled or by being mechanically separate but communicating with each other to travel together, such as in a convoy) along the route that may be tracks, highways, land-based paths, airborne paths, waterways, or the like. As one example, the vehicle system can be formed from two or more different vehicles (e.g., a rail car and an automobile, an aircraft and an unmanned drone, or the like).

The system can include an off-board database 102 that is disposed off-board the vehicle system. The off-board database may be an example of a back-office server, but additionally or alternatively may be a wayside device, a network control system, or the like.

The off-board database can include a communication device 132 that communicates with the vehicle system. For example, the off-board database may communicate with the vehicle system to notify the vehicle system where the vehicle system is allowed to travel, how fast the vehicle system is allowed to travel, or the like. The communication device may include the same or similar components as other communication devices described herein.

The off-board database may include a controller 130, referred to herein as an off-board controller. The off-board controller can represent hardware circuitry that includes and/or is connected with one or more processors that perform operations of the off-board database. The off-board controller can receive signals from one vehicle of the vehicle system, and relay the signals to different vehicles of the vehicle system, to different vehicles of other vehicle systems, or the like. The off-board controller may also be referred to as an office communication manager (OCM) such that the OCM manages the communication signals to and from the different vehicles of the vehicle systems, between different vehicle systems, or any combination therein.

In one or more embodiments, the off-board controller can examine signals received from the vehicles of the vehicle system and implement one or more responsive actions. As one example, the off-board controller may issue one or more speed restrictions to the vehicle system and/or to other vehicle systems. The speed restrictions can be a designation of one or more segments of the route in which the vehicle systems are not allowed to move faster than a designated speed limit (e.g., which is slower than the speed limit of the route and/or than the vehicle systems are capable or moving). The off-board controller can identify the location of one or more vehicle systems and/or route devices based on information included in the signals.

The off-board database may include a memory 134 that can store locations of route devices, corresponding identifications of route devices, locations and identifications of vehicles and corresponding vehicle systems of which the vehicles are associated with, and/or any additional information pertaining to the vehicles of the vehicle systems, the route, or the like. Additionally or alternatively, the memory may store information about the vehicle systems that communicate the signals, route information along which the vehicle systems move, or the like.

In one embodiment, the off-board database represents a back-office server of a positive train control system. Alternatively, the off-board database represents another computerized system that communicates with vehicle systems described herein.

The system includes a first vehicle 104 and a second vehicle 106 that travel together along the route. In the illustrated embodiment, the first vehicle is behind or to the rear of the second vehicle based on the direction of travel of the vehicle system. The first vehicle may also be referred to as the End-of-Train (EOT) vehicle, and the second vehicle may also be referred to as the Head-of-Train (HOT) vehicle.

The first vehicle includes a first vehicle controller 124 that can represent hardware circuitry that includes and/or is connected with one or more processors that perform operations of the first vehicle. The first vehicle controller may include a communication device that may be operably coupled with and/or include transceiving circuitry, such as antenna 118 that may be used to communicate with the off-board database via a first bi-communication link 114. For example, the first vehicle controller may communicate signals between the first vehicle and the off-board database via the first bi-communication link.

The second vehicle includes a second vehicle controller 126 that can represent hardware circuitry that includes and/or is connected with one or more processors that perform operations of the second vehicle. The second vehicle controller may include a communication device that may be operably coupled with and/or include transceiving circuitry, such as antenna 120 that may be used to communicate with the off-board database via a second bi-communication link 116. For example, the second vehicle controller may communicate signals between the second vehicle and the off-board database via the second communication link.

In one or more embodiments, the first vehicle may communicate with the off-board database via a first communication system and the second vehicle may communicate with the off-board database via a second communication system. As one example, the off-board database may receive a signal from the EOT vehicle via the first communication system and may relay the signal to the HOT vehicle via the second communication system. Additionally or alternatively, the off-board database may receive a signal from the HOT vehicle via the second communication system and may relay the signal to the EOT vehicle via the first communication system.

As one example, the first and second vehicle controllers may be incapable of communicating directly with each other. The first communication system may be different than the second communication system. For example, the first communication system may have a version of software, a protocol, or the like, that is different than a version of software, a protocol, or the like, of the second communication system. Additionally, the off-board database may be capable of responding to each the first and second vehicles in the different respective protocols. For example, the off-board database may include circuitry, software, protocols, or the like, of both the first and second communication systems and may bridge communication between the first and second vehicles. Optionally, the first vehicle may include the software, circuitry, protocol, or the like, of the first and second communication systems, but the second vehicle may have the software, circuitry, protocol, of the like, of only one of the first or second communication systems.

In another embodiment, the first and second vehicles may be capable of communicative directly together, but communicate with each other via the off-board database. For example, a distance between the first vehicle and the second vehicle may prohibit communication directly between the first vehicle and the second vehicle. For example, the first vehicle may be outside of a line of sight of the second vehicle, or one or more objects may be disposed between the first and second vehicles that may interrupt direct communication between the first and second vehicles (e.g., the first vehicle may be inside a tunnel, may be around a corner from the second vehicle, or the like) that may reduce the integrity of a direct communication link between the first and second vehicles.

As one example, the first vehicle may communicate with the off-board database via a cellular communication link, and the second vehicle may communicate with the off-board database via an interoperable train control message (ITCM) via the I-ETMS. Optionally, the first and second vehicles may communicate with the off-board database via any suitable wireless model, such as radio frequency devices, any radio frequency identification (RFID) wireless communications, near field communications (NFC), Bluetooth, Wi-Fi, 3G, 4G, 5G, or others. For example, the first vehicle controller may have the circuitry, equipment, protocol, or the like, to communicate via 4G and 5G, but the second vehicle controller may have the circuitry, equipment, protocol, or the like, to communicate via Bluetooth.

In one or more embodiments, the off-board database may communicate with the first and second vehicles via different communication systems based on a strength of the different communication systems. For example, the first vehicle may communicate with the off-board database via a 5G communication link that is stronger than a 4G communication link between the first vehicle and the off-board database. Alternatively, the second vehicle may communicate with the off-board database via a 3G communication link that is stronger than a 5G communication link between the second vehicle and the off-board database. Optionally, a 5G communication system may be available at the first vehicle but a 5G communication system may not be available at the second vehicle. The off-board database may communicate with the first vehicle via the 5G communication system, and may communicate with the second vehicle via a different communication system.

Figure 2:
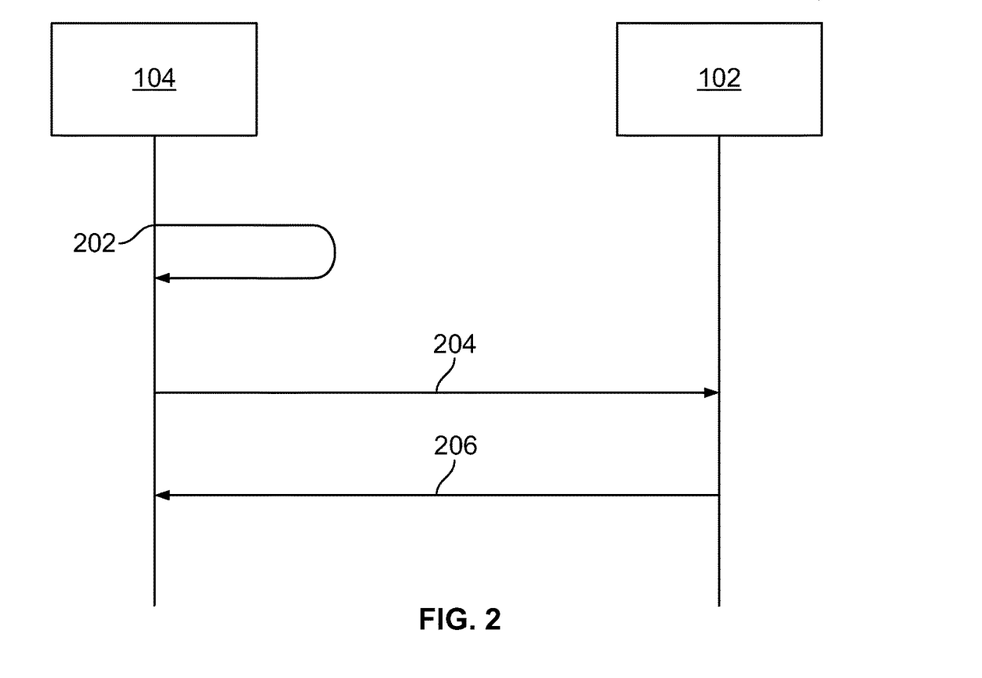
FIG. 2 illustrates a sequence diagram of communication between an off-board database and a first vehicle of the system in accordance with one embodiment.

FIG. 2 illustrates one example of a sequence diagram 200 of communication between the off-board database and the first vehicle (e.g., the EOT vehicle) of the system via the first communication link 114. At 202, the first vehicle controller powers on. At 204, the first vehicle controller sends a signal such as registration request to communicatively connect with the off-board controller. As one example, the off-board controller may be listening or waiting for the request from the EOT vehicle. Optionally, the off-board controller may periodically listen for communication requests via a certain protocol, or the like.

The registration request from the first vehicle controller may include an identification of the first vehicle, a position and/or location of the first vehicle, identification of the route along which the first vehicle is traveling or will be traveling, or the like. Optionally, the registration request may include an identification of one or more other vehicles and/or vehicle systems that the first vehicle may want to communicate with. For example, the first vehicle may have been positioned within a railyard, and may be mechanically coupled to move along the route with the vehicle system. Optionally, the first vehicle may have been operably coupled with a vehicle system A, disconnected from the vehicle system A, and operably coupled with a different vehicle system B. The registration request from the first vehicle may identify the vehicles of the vehicle system B that the first vehicle may wish to communicate with, and may not identify the vehicles of the vehicle system A that the first vehicle no longer communicates with. Optionally, the registration request may include any alternative information of the first vehicle, the first vehicle controller, or the like.

At 206, the off-board controller communicates a response signal to the first vehicle controller that the registration request was received and accepted by the off-board controller. The response signal may indicate other vehicles that the first vehicle is setup to communicate with via the off-board database. For example, the response signal may indicate that the first vehicle may send and receive communication signals via the off-board database from the vehicles of the vehicle system B, and may indicate that the first vehicle may not send or receive communication signals via the off-board database from the vehicles of the vehicle system A.

In one or more embodiments, the first vehicle controller may not receive a response signal from the off-board controller, or the response signal may be received after a predetermined time limit has expired. For example, the registration request may not have been received by the off-board database, may have been received by an incorrect off-board database, or the like. As one example, if a predetermined amount of time expires between when the registration request was communicated and no response signal is received, the first vehicle controller may send a new registration request, may modify the registration request (e.g., change one or more parameters of the registration request), may communicate the request to a different off-board database, or the like. Optionally, the first vehicle controller may have one or more directions, procedures, protocols, or the like, that may direct the first vehicle controller how to operate if a response signal is not received within the predetermined time limit.

Additionally or alternatively, the response signal from the off-board controller to the first vehicle controller may include a status request or command. As one example, the off-board controller may direct the first vehicle to change an operational setting of the first vehicle (e.g., a brake setting, a throttle setting, or the like). Optionally, the off-board controller may inquire about the state of one or more systems of the first vehicle, such as the health or how a propulsion system, a brake system, or the like, is running.

Figure 3:
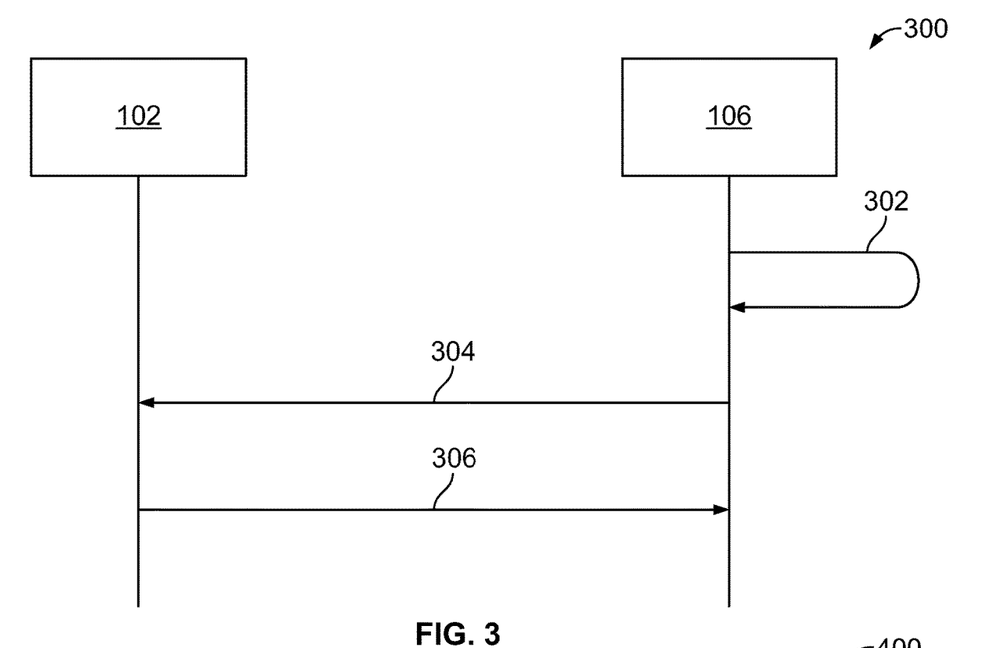
FIG. 3 illustrates a sequence diagram of communication between an off-board database and a second vehicle of the system in accordance with one embodiment.

FIG. 3 illustrates a sequence diagram 300 of communication between the off-board database and the second vehicle (e.g., the HOT vehicle) of the vehicle system via the second communication link 116. At 302, the second vehicle controller powers on. At 304, the second vehicle controller sends a signal such as registration request to communicatively connect with the off-board controller. And at 306, the off-board controller communicates a response signal to the second vehicle controller that the registration request was received and accepted by the off-board controller.

The sequence diagram 300 may operate similarly to the sequence diagram 200 illustrated in FIG. 2. For example, the off-board controller may listen or wait for the request from the second vehicle, may periodically listen for communication requests via a certain protocol, or the like. The registration request from the second vehicle controller may include an identification of the second vehicle, a position and/or location of the second vehicle, identification of the route along which the second vehicle is traveling or will be traveling, or may include an identification of one or more other vehicles and/or vehicle systems that the second vehicle may want to communicate with. A response signal from the off-board database to the second vehicle controller may indicate other vehicles that the second vehicle is setup to communicate with via the off-board database. The second vehicle controller may also have one or more directions, procedures, protocols, or the like, that may direct the second vehicle controller how to operate if a response signal is not received within the predetermined time limit, or the like.

In one or more embodiments, the off-board controller may receive and accept the registration request from the second vehicle controller because the first vehicle has identified that the first vehicle would like to communicate with the second vehicle. Optionally, the off-board controller may accept the registration request from the second vehicle controller because the second vehicle is in a particular location or position, such as a particular city, state, region, or the like. Optionally, the registration request from the second vehicle controller may meet some alternative prerequisite.

FIG. 3 illustrates one example of the HOT vehicle directly communicating with the off-board database. Alternatively, the HOT may indirectly communicate with the off-board database. For example, the second communication link between the second vehicle and the off-board database may include a bridge system. As one example, the bridge system may be an interoperable electronic train management system (I-ETMS). The off-board database may be communicatively linked with the I-ETMS and the second vehicle may be communicatively linked with the I-ETMS such that the I-ETMS may be a bridge between the off-board database and the second vehicle.

Figure 4:
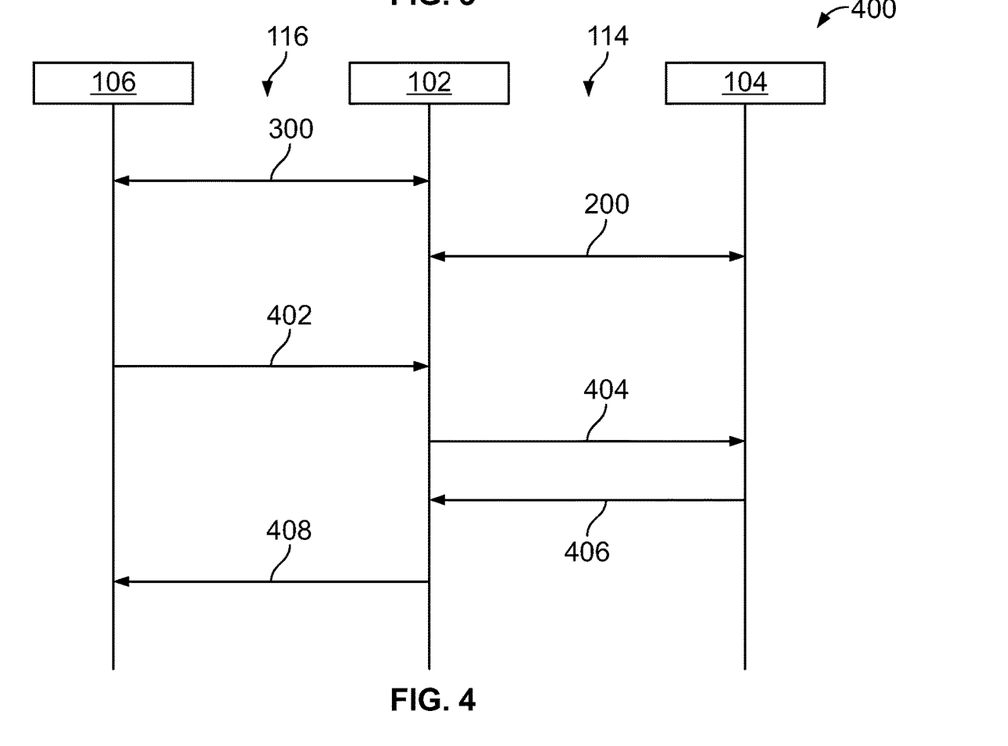
FIG. 4 schematically illustrates a sequence diagram of communication between a first vehicle and a second vehicle via an off-board database in accordance with one embodiment.

FIG. 4 illustrates one example of a sequence diagram 400 of communication between the first and second vehicles via the off-board database. The first vehicle may communicate with the off-board controller via the first communication system 114, and the second vehicle may communicate with the off-board controller via the second communication system 116 that is different than the first communication system. The first and second vehicles may be operably coupled together (e.g., mechanically and/or logically) as two different vehicles of a common vehicle system that may move together along the route. In one or more embodiments, the first vehicle may be a rail vehicle that may move along tracks, and the second vehicle may be a marine vessel that may move along a waterway. Optionally, the first and second vehicles may be aircrafts that may move along common or different airspaces.

The first vehicle establishes the first bi-communication link with the off-board controller at 200, and the second vehicle establishes the second bi-communication link with the off-board controller at 300. The links may be established one before another, at substantially the same time, or the like. In one or more embodiments, the first vehicle (e.g., the EOT vehicle) may need to establish the communication link before the second vehicle (e.g., the HOT vehicle) can establish the communication link with the off-board database. As one example, the first vehicle may need to identify the second vehicle to the off-board database as one vehicle the first vehicle may want to communicate with. Until the first vehicle identifies the second vehicle, the second vehicle may not be able to establish the communication link with the off-board database.

Once the bi-directional communication links are established between the first and second vehicles and the off-board database, the first and second vehicles may communicate with each other via the off-board database. For example, the off-board database may act as a communication bridge between the first and second vehicles. In one or more embodiments, the bi-directional communication links may communicatively link the first vehicle with the second vehicle via the off-board database for as long as the first and second vehicles are operably coupled within the common vehicle system. For example, establishing the bi-directional links arms the first vehicle to communicate with the second vehicle. In another embodiment, the bi-directional communication links may communicatively link the first vehicle with the second vehicle while the first and second vehicles are within a specific location or region, such as a state, city, county, state, or the like. If one or both of the first or second vehicles moves outside of the location or region, the first and second vehicles may need to re-establish bi-directional communication links with the off-board database, with a different off-board database, or the like. Optionally, as the vehicle system moves along the route, one or more new vehicles may be added to the vehicle system, and one of the new vehicles may be designated a new first vehicle or a new EOT vehicle. The new EOT vehicle may need to establish the bi-directional communication link with the off-board database to communicate with the second or HOT vehicle.

In one or more embodiments, one of the vehicles may be a gate-keeper or controller that may direct the off-board database from which other vehicles the vehicle may receive communication signals from. For example, in one embodiment, a vehicle A may control the communication relationship between the vehicle A and a vehicle B. The off-board database may not relay a communication signal from the vehicle B to the vehicle A until the vehicle A identifies the vehicle B as a vehicle the vehicle A wants to receive communication signals from. As another example, both vehicles A and B may need to identify each other with the off-board database before the off-board database can relay messages between the vehicles A and B.

At 402, the second vehicle sends a message from the second vehicle to the first vehicle via the off-board database. The message may include an identification of the second vehicle. For example, the off-board database may only relay the message if the message is received from a second vehicle that has been identified by the first vehicle as a second vehicle that the first vehicle does want to communicate with. Optionally, the message may include an identification of the first vehicle. For example, the off-board database may be a central communication bridge between plural vehicles of plural different vehicle systems. The message from the second vehicle may indicate the correct first vehicle that should receive the message. Optionally, the message may include an identification of the first vehicle controller, or of one or more processors of the first vehicle, such as an IP address of the first vehicle controller, or the like.

In one or more embodiments, the message may be a request for a status update, such as the state of health of one or more systems of the first vehicle, such as the state of one or more systems (e.g., a current brake and/or throttle setting), or the like. Optionally, the message may include a command, such as an operational command, directing the first vehicle to change one or more operational settings of the first vehicle. In one or more embodiments, the first vehicle may receive the command, and the first vehicle controller may automatically change the one or more operational settings based on the command received from the second vehicle. Optionally, the command may direct an operator onboard the first vehicle to manually change one or more operational settings of the first vehicle. Optionally, the message from the second vehicle may have any alternative information.

At 404, the off-board database conveys the message from the second vehicle to the first vehicle. As one example, the off-board database may convey the message directly to the first vehicle. Optionally, the off-board database may alter or manipulate the message before relaying the manipulated message to the first vehicle. For example, the message from the second vehicle may request information about a throttle setting of the first vehicle. The off-board database may have information about the throttle setting of the first vehicle, may respond to the second vehicle with the information about the throttle setting of the first vehicle, and may eliminate or remove this portion of the message before relaying the rest of the message to the first vehicle.

At 406, the first vehicle communicates a response to the off-board database in response to receiving the message from the off-board database. The response may include an identification of the first vehicle and may address the message received from the second vehicle. For example, the response may include a confirmation that the first vehicle received the message. Additionally or alternatively, the response may include a response to a command and/or a status request, such as confirmation that the operational setting was changed, a state or health of one or more systems of the first vehicle, or the like.

At 408, the off-board database relays the response from the first vehicle to the second vehicle. In one embodiment, the off-board database may relay the original message as it was received from the first vehicle. Optionally, off-board database may alter or manipulate the response from the first vehicle before the off-board database communicates the manipulated response to the second vehicle.

In one or more embodiments, the off-board database may communicate the response from the first vehicle to plural vehicles of the vehicle system, and/or to one or more vehicles of other vehicle systems. For example, the off-board database may communicate the response from the first vehicle to the second vehicle (e.g., the HOT vehicle), and each other vehicle operably coupled with the first and second vehicles. Additionally or alternatively, the off-board database may communicate the message from the second vehicle to the first vehicle and one or more other vehicles of the vehicle system, or one or more other vehicles of another vehicle system.

For example, in an embodiment where the off-board database is or includes a back-office server of a positive train control system, the off-board controller can generate or change a movement authority, a movement bulletin, or a movement schedule for the vehicle system and/or for at least one other vehicle system responsive to receiving the message from the second vehicle and/or the response signal from the first vehicle. In one embodiment, the off-board controller may remotely change a vehicle speed, gear setting, engine speed, brake engagement, or the like, of the first and/or second vehicles, or another vehicle of the vehicle system. Optionally, the off-board controller may communicate a bulletin to an operator onboard the vehicle system to manually change an operational setting (e.g., brake setting, throttle setting) of one or each of the vehicles of the vehicle system. Optionally, the off-board controller may communicate an alert to the operator.

Optionally, the movement authority, bulletin, or schedule can communicate the message and/or response with another vehicle system based on the message and the response communicated between the first and second vehicles. For example, the positive train control system can selectively issue a signal to one or more other vehicle systems to communicate the message and/or response with the other vehicle systems.

In one or more embodiments, the message from the second vehicle may be directed through two or more different off-board databases or two or more different processors, controllers, network systems, or the like, before the first vehicle receives the message from the second vehicle. For example, the message may be sent from the second vehicle to the off-board database, from the off-board database to another network system (e.g., disposed separate from or within the off-board database), and from the other network system to the first vehicle.

In one or more embodiments, the off-board database may be a communication bridge between the second vehicle and another off-board database, a network system, or the like. For example, the second vehicle may need to communicate with a back-office server, but the second vehicle and the back-office server may not be setup with software, circuitry, systems, or the like, to communicate directly with each other. The back-office server may send messages to the second vehicle via the off-board database, and the second vehicle may communicate responses to the back-office server via the off-board database. Optionally, one or more off-board databases may be communication bridges for different vehicles, different wayside devices, different databases, or any combination therein.

In one or more embodiments, one or more of the messages or responses between the first and second vehicles may be encrypted or secured. For example, an encrypted message may be communicated from the second vehicle to the first vehicle via the off-board database. The off-board database may not have or have knowledge of the decryption or key of the encrypted message. The message may remain secure or encrypted until the message is relayed to the first vehicle that may have the decryption or key. Optionally, the first vehicle may communicate a secured or non-secured response to the second vehicle via the off-board database.

In one or more embodiments, the off-board database may be a first off-board database that may communicate with the vehicle system while the vehicle system is within a first location and/or position. For example, the first vehicle may disconnect from the first off-board database, and may establish a new first communication link with a second off-board database when the vehicle system is in a different location, such as a different city, county, state, or the like.

Communication with different back office servers may require onboard components of the vehicle system to have different versions of software, different communication protocols, or the like. A vehicle system having a software version or communication protocol that can communicate with the back-office server associated with route segments in one area may not be the correct version or protocol for communicating with another back-office server associated with route segments in another area. The vehicle system may need to update or change the software version or communication protocol before entering into and/or traveling within the other area.

The first and second vehicle controllers may determine software versions, communication protocols, and/or database content of onboard components of the positive train control system. For example, the vehicle controllers can wirelessly communicate with onboard components of the respective vehicles to determine the version of software running onboard the vehicle system (that communicates with the off-board controller). As another example, the vehicle controllers can communicate with onboard components of the vehicles to determine the communication protocol used by the onboard components to communicate with the off-board controller. As another example, the vehicle controllers can communicate with onboard components of the vehicles to determine the contents of a database (e.g., memory) onboard the vehicles. The vehicle controllers can determine whether any of these characteristics indicates that the vehicles are able to communicate with a back office server (e.g., the off-board controller) or whether a software version change, a change in communication protocol, and/or a modification of the information stored onboard the vehicles is needed before the vehicles can communicate with the off-board controller.

As used herein, references to a positive train control system, unless otherwise specified, are also applicable to positive vehicle control systems more generally. A positive vehicle control system is a system where a vehicle is configured for movement allowances (e.g., to move, or be controlled to move) only if the vehicle receives a designated signal(s) from offboard the vehicle. The system may include onboard interlocks that prevent the vehicle from moving unless the designated signal is received, and/or if the vehicle is already moving, that bring the vehicle to a stop (or to another designated operational condition) responsive to discontinued receipt of the designated signal(s), e.g., the signal(s) not being received during a designated time period.

Thus, in one embodiment, a system includes one or more processors onboard a first vehicle configured to establish a communication link between the first vehicle and an off-board database of a positive vehicle control system. The first vehicle and the off-board database are configured to be communicatively linked via a first communication system. The positive vehicle control system is configured, in part using the database, to communicate positive vehicle control bulletins, messages, or other designated signals to designated vehicles in a transportation network; the designated vehicles are configured for movement allowance only if they receive the designated signals under designated operational circumstances (e.g., according to a designated periodicity, or within a designated time period, etc.). For example, the database may include information about the designated vehicles, information about the designated signals, information about routes, regions, etc. in which vehicles are not allowed to travel, information about routes experiencing conditions where vehicles are not to be allowed to move, information about current vehicle locations and conditions, and so on. The one or more processors are configured to receive a message from a second vehicle via the off-board database. The second vehicle and the off-board database are configured to be communicatively coupled via a second communication system. The one or more processors are configured to communicate a response from the first vehicle to the second vehicle via the off-board database.

In another embodiment, the first vehicle and/or the second vehicle are configured to autonomously or automatically change operations (e.g., stop, move to a different route or path, or otherwise change movement) based at least in part on the message and/or response that are communicated.

In one or more embodiments of the subject matter described herein, a method includes establishing a communication link between a first vehicle and an off-board database. The first vehicle and the off-board database are communicatively linked via a first communication system. A message from a second vehicle may be received via the off-board database. The second vehicle and the off-board database are communicatively coupled via a second communication system. A response may be communicated from the first vehicle to the second vehicle via the off-board database.

Optionally, the message from the second vehicle may include an identification of the second vehicle.

Optionally, the message from the second vehicle may include one or more of a status request or a command.

Optionally, the response to the second vehicle may include an identification of a device onboard the first vehicle.

Optionally, establishing the communication link may include communicating an identification of the first vehicle from the first vehicle to the off-board database.

Optionally, the method may include communicating a response to another vehicle via the off-board database.

Optionally, the method may include changing an operation setting of the first vehicle responsive to receiving the message from the second vehicle.

Optionally, the off-board database may be a first off-board database. The method may include disconnecting the communication link between the first vehicle and the first off-board database, and establishing a communication link between the first vehicle and a second off-board database.

Optionally, the first vehicle and the second vehicle may be operably coupled within a common vehicle system.

Optionally, the first vehicle may be outside of a line of sight of the second vehicle.

Optionally, the first vehicle may be communicatively linked with the off-board database via the first communication system and the second communication system, and the second vehicle may be communicatively linked with the off-board database via the second communication system.

In one or more embodiments of the subject matter described herein, a system includes one or more processors onboard a first vehicle that may establish a communication link between the first vehicle and an off-board database. The first vehicle and the off-board database are configured to be communicatively coupled via a first communication system. The one or more processors may receive a message from a second vehicle via the off-board database. The second vehicle and the off-board database may be communicatively coupled via a second communication system. The one or more processors may communicate a response from the first vehicle to the second vehicle via the off-board database.

Optionally, the message from the second vehicle may include an identification of the second vehicle.

Optionally, the message from the second vehicle may include one or more of a status request or a command.

Optionally, the response to the second vehicle may include an identification of the first vehicle.

Optionally, the one or more processors may communicate an identification of the first vehicle from the first vehicle to the off-board database.

Optionally, the one or more processors may communicate a response from the first vehicle to another vehicle via the off-board database.

Optionally, the one or more processors may change an operating setting of the first vehicle responsive to receiving the message from the second vehicle.

Optionally, the off-board database may be a first off-board database. The one or more processors may disconnect the communication link between the first vehicle and the first off-board database, and may establish a communication link between the first vehicle and a second off-board database.

Optionally, the first vehicle and the second vehicle may be operably coupled within a common vehicle system.

Optionally, the first vehicle may be outside of a line of sight of the second vehicle.

Optionally, the first vehicle may be communicatively linked with the off-board database via the first communication system and the second communication system, and the second vehicle may be communicatively linked with the off-board database via the second communication system.

In one or more embodiments of the subject matter described herein, a method includes establishing a communication link between a first vehicle and an off-board database. The first vehicle and the off-board database are communicatively linked via a first communication system. A message from a second vehicle may be received via the off-board database. The second vehicle and the off-board database are communicatively coupled via a second communication system. An operating setting of the first vehicle may be changed responsive to receiving the message from the second vehicle. A response may be communicated from the first vehicle to the second vehicle via the off-board database.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
  establishing a communication link between a first vehicle and an off-board database, wherein the first vehicle and the off-board database are communicatively linked via a first communication system;
  receiving a message from a second vehicle via the off-board database, the second vehicle and the off-board database communicatively linked via a second communication system that is different than the first communication system, wherein the first vehicle is communicatively linked with the off-board database via the first communication system and the second communication system, and the second vehicle is communicatively linked with the off-board database via the second communication system; and communicating a response from the first vehicle to the second vehicle via the off-board database, wherein the first vehicle is unable to directly communicate with the second vehicle based on the first communication system being incompatible with the second communication system.

2. The method of claim 1, wherein the message from the second vehicle comprises an identification of the second vehicle.

3. The method of claim 1, wherein the message from the second vehicle includes one or more of a status request or a command.

4. The method of claim 1, wherein the response to the second vehicle includes an identification of a device onboard the first vehicle.

5. The method of claim 1, wherein establishing the communication link includes communicating an identification of the first vehicle from the first vehicle to the off-board database.

6. The method of claim 1, further comprising communicating a response to another vehicle via the off-board database.

7. The method of claim 1, further comprising changing an operating setting of the first vehicle responsive to receiving the message from the second vehicle.

8. The method of claim 1, wherein the off-board database is a first off-board database, further comprising disconnecting the communication link between the first vehicle and the first off-board database, and establishing a communication link between the first vehicle and a second off-board database.

9. The method of claim 1, further comprising communicating the response from the first vehicle to the second vehicle via the off-board database based on a location of one or both of the first vehicle or second vehicle.

10. A system comprising:
one or more processors onboard a first vehicle configured to establish a communication link between the first vehicle and an off-board database, wherein the first vehicle and the off-board database are configured to be communicatively linked via a first communication system,
wherein the one or more processors are configured to receive a message from a second vehicle via the off-board database, the second vehicle and the off-board databased configured to be communicatively coupled via a second communication system that is different than the first communication system,
wherein the first vehicle is communicatively linked with the off-board database via the first communication system and the second communication system, and wherein the second vehicle is communicatively linked with the off-board database via the second communication system,
wherein the one or more processors are configured to communicate a response from the first vehicle to the second vehicle via the off-board database, and
wherein the first vehicle is unable to directly communicate with the second vehicle based on the first communication system being incompatible with the second communication system.

11. The system of claim 10, wherein the message from the second vehicle comprises an identification of the second vehicle.

12. The system of claim 10, wherein the message from the second vehicle includes one or more of a status request or a command.

13. The system of claim 10, wherein the response to the second vehicle includes an identification of the first vehicle.

14. The system of claim 10, wherein the one or more processors are configured to communicate an identification of the first vehicle from the first vehicle to the off-board database.

15. The system of claim 10, wherein the one or more processors are configured to communicate a response from the first vehicle to another vehicle via the off-board database.

16. The system of claim 10, wherein the one or more processors are configured to change an operating setting of the first vehicle responsive to receiving the message from the second vehicle.

17. The system of claim 10, wherein the off-board database is a first off-board database, wherein the one or more processors are configured to disconnect the communication link between the first vehicle and the first off-board database, and establish a communication link between the first vehicle and a second off-board database.

18. The system of claim 10, wherein the first vehicle is outside of a line of sight of the second vehicle.

19. The system of claim 10, wherein the first vehicle is configured to communicate the response to the second vehicle via the off-board database based on a location of one or both of the first vehicle or the second vehicle.

20. A method comprising:
establishing a communication link between a first vehicle and an off-board database, wherein the first vehicle and the off-board database are communicatively linked via a first communication system, wherein establishing the communication link includes communicating an identification of the first vehicle from the first vehicle to the off-board database;
receiving a message from a second vehicle via the off-board database, the second vehicle and the off-board database communicatively linked via a second communication system that is different than the first communication system, wherein the first vehicle is communicatively linked with the off-board database via the first communication system and the second communication system, and wherein the second vehicle is communicatively linked with the off-board database via the second communication system;
changing an operating setting of the first vehicle responsive to receiving the message from the second vehicle; and
communicating a response from the first vehicle to the second vehicle via the off-board database, wherein the first vehicle is unable to directly communicate with the second vehicle based on the first communication system being incompatible with the second communication system.

* * * * *